G H. BENNET.
HAY COCKER.
APPLICATION FILED MAR. 22, 1919.
1,347,141.
Patented July 20, 1920.
2 SHEETS—SHEET 1.
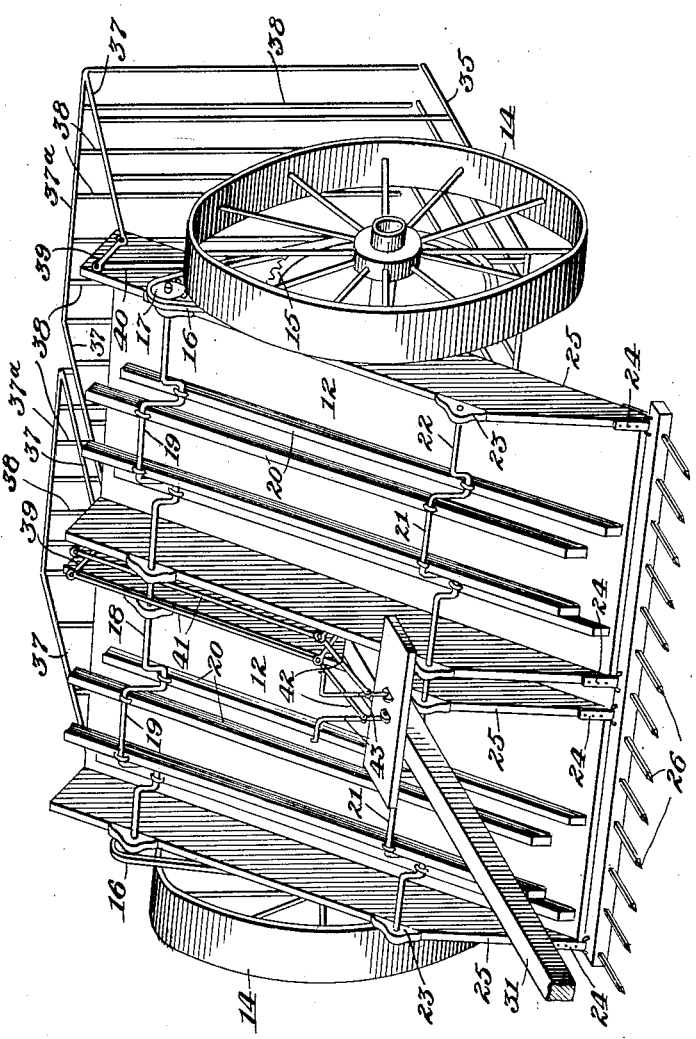

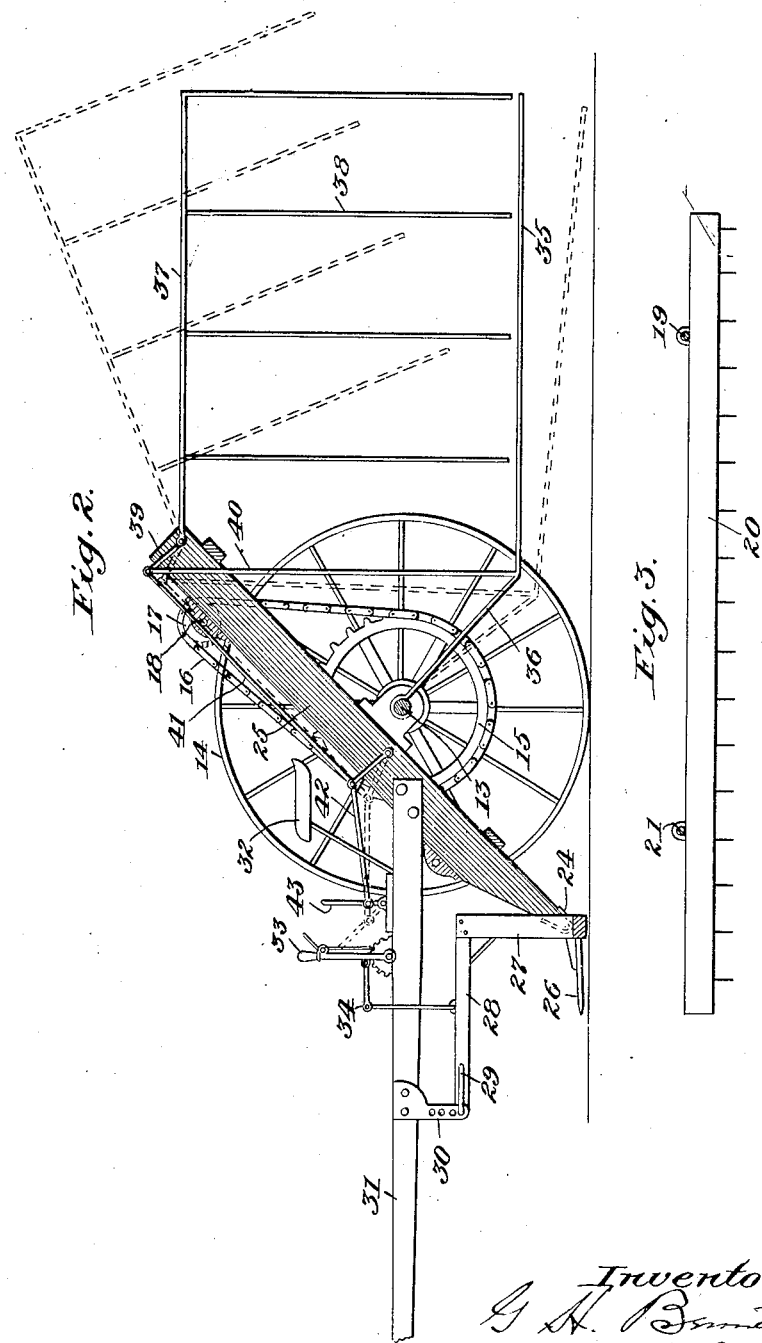

UNITED STATES PATENT OFFICE.

G HENRY BENNET, OF SPRINGDALE, MONTANA, ASSIGNOR OF ONE-HALF TO WILLIAM HRUZA, OF LIVINGSTON, MONTANA.

HAY-COCKER.

1,347,141.

Specification of Letters Patent.

Patented July 20, 1920.

Application filed March 22, 1919. Serial No. 284,270.

*To all whom it may concern:*

Be it known that I, G HENRY BENNET, a citizen of the United States, residing at Springdale, in the county of Park and State of Montana, have invented or discovered certain new and useful Improvements in Hay-Cockers, of which the following is a specification, reference being had therein to the accompanying drawings.

This invention relates to a hay cocker which comprises means for taking hay from the ground and carrying it up and over an inclined platform so as to deposit it in a suitable receptacle or receptacles at the rear of the machine, and which receptacle or receptacles, when properly filled, will be dumped to deposit the hay on the ground in heaps or shocks.

In the accompanying drawings Figure 1 is a perspective view of the improved hay cocker, and Fig. 2 is a sectional side view thereof, Fig. 3 is a detail view of one of the walking rakes.

Referring to the drawings, 12 denotes an inclined platform which is suitably supported from an axle 13 provided with wheels 14 on which the machine will run. Rotating with the wheels 14 are sprocket wheels 15 connected by chains 16 with smaller sprocket wheels 17 at the opposite ends of a shaft 18 provided with cranks 19 carrying alternately acting walking rakes 20, said walking rakes being connected at their lower parts to cranks 21 on an idly operating crank shaft 22 supported in suitable bearings 23 at the lower part of the machine.

Pivotally hung in loops or straps 24 attached to the lower ends of strips 25 mounted on the inclined platform 12 is a rake 26 having forwardly projecting teeth which take the hay from the ground so that it will pass up to the inclined platform 12 and will be carried upward and over said platform by the walking rakes 20. Connected with the pivotally hung rake 26 is an upright bar 27 having fixed thereto a horizontally extending bar 28 provided at its forward end with a part 29 by which it may be adjustably connected with a hanger 30 depending from the draft tongue or pole 31, so that the working position of the teeth of the rake 26 may be varied, as may be desired, to adjust said teeth to a suitable height above the ground. The driver's seat 32 is herein shown as being supported on the draft pole 31, and conveniently accessible to the driver's seat is a handle 33 to operate the connection 34 by which the teeth of the rake may be lifted when the cocker is to travel over roads, or the like, and in such case the part 29 may be disconnected from the hanger 30. The seat 32 is omitted from Fig. 1 for clearness of illustration.

The hay receptacle or basket is formed in two sections and comprises suitable wires or rods. The bottom part 35 of the hay receptacle or basket comprises a series of horizontally extending rods connected with or forming extensions of inclined rods 36 running up to the axle 13 so that said bottom part of said receptacle or basket will be partly supported from said axle or some other fixed part of the machine frame.

The top portion of the hay receptacle or basket comprises side bars 37 and a back bar 37ª from which depend rods 38 forming the sides and back of the receptacle. The bars 37 are pivoted on the inclined strips 25 and are provided with short crank or lever arms 39 connected by rods or links 40 with the lower portion of the receptacle or basket.

The top part of the hay receptacle or basket is sufficiently heavy to overbalance the lower portion thereof and thus normally keep the said receptacle or basket closed; but, if desired, a suitable locking or retaining device may be provided to hold the said receptacle or basket closed. The receptacle or basket may be opened to dump or discharge the hay, by any suitable tripping means to be operated by the driver of the cocker. As herein shown, to provide a convenient dumping means, the inner short lever arms 39 are connected by links 41 to toggles 42 which are in turn connected to foot levers 43 to be operated by the driver, to lift the top portion of the hay receptacle or basket and to lower the bottom part thereof, as denoted by dotted lines in Fig. 2.

The improved hay cocker is preferably made of sufficient width, as shown in Fig. 1, to take up two swaths of hay at the same time, and each section will preferably be provided with a separate basket or hay receptacle at the rear, and these baskets or receptacles may be dumped alternately if desired. Of course it will be understood that only a single dumping hay receptacle or basket may be employed if desired.

The platform 12 and the inclined strips 25, affording two troughs in which the hay is carried upward by the walking rakes 20, constitute the frame of the machine which, with the axle or cross-bar 13 and the wheels 14, constitute a wheeled frame, the draft tongue or pole 31 being attached to said frame between the central strips 25 which form the inner sides of the two troughs just referred to.

From the foregoing it will be understood that the invention provides a simple and efficient hay cocker which will effectively perform the work for which it is intended.

Having thus described my invention, I claim and desire to secure by Letters Patent:

In a hay cocker, the combination with a wheeled frame comprising an inclined platform, of a hay gathering rake pivotally mounted at the lower end of said platform, means for adjusting said rake to different working positions, walking rakes for carrying the hay upward and over said platform, and dumping receptacles receiving the hay at the rear of the machine, said platform being provided with strips to form two troughs between which troughs the draft tongue or pole of the machine is mounted.

In testimony whereof I affix my signature.

G HENRY BENNET.